(12) United States Patent
Kawamoto

(10) Patent No.: US 12,341,213 B2
(45) Date of Patent: Jun. 24, 2025

(54) POWER STORAGE DEVICE

(71) Applicant: TOYOTA JIDOSHA KABUSHIKI KAISHA, Toyota (JP)

(72) Inventor: Naoya Kawamoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 488 days.

(21) Appl. No.: 17/844,788

(22) Filed: Jun. 21, 2022

(65) Prior Publication Data

US 2022/0416354 A1 Dec. 29, 2022

(30) Foreign Application Priority Data

Jun. 23, 2021 (JP) ................................. 2021-104014

(51) Int. Cl.
*H01M 50/264* (2021.01)
*H01M 50/209* (2021.01)
*H01M 50/291* (2021.01)

(52) U.S. Cl.
CPC ....... *H01M 50/264* (2021.01); *H01M 50/209* (2021.01); *H01M 50/291* (2021.01)

(58) Field of Classification Search
CPC ............ H01M 50/264; H01M 50/209; H01M 50/291; H01M 50/289; H01M 50/244; H01M 50/258
USPC ......................................................... 429/99
See application file for complete search history.

(56) References Cited

U.S. PATENT DOCUMENTS

| 2014/0158396 A1* | 6/2014 | Nakayama | H01B 17/56 |
| | | | 174/138 F |
| 2015/0144409 A1* | 5/2015 | Fujii | H01M 50/519 |
| | | | 429/121 |
| 2015/0228945 A1* | 8/2015 | Maruoka | H01M 50/211 |
| | | | 429/152 |
| 2018/0138473 A1 | 5/2018 | Bessho et al. | |
| 2019/0051872 A1 | 2/2019 | Kakimura | |
| 2019/0198830 A1 | 6/2019 | Kawakami et al. | |

FOREIGN PATENT DOCUMENTS

| CN | 107851753 A | | 3/2018 |
| CN | 109962192 A | | 7/2019 |
| JP | 2001-236937 A | | 8/2001 |
| JP | 2010040295 A | * | 2/2010 |
| JP | 2012-113961 A | | 6/2012 |
| JP | 2019-032997 A | | 2/2019 |
| JP | 2020-187853 A | | 11/2020 |

* cited by examiner

*Primary Examiner* — Nicholas A Smith
*Assistant Examiner* — Kevin Nguyen
(74) *Attorney, Agent, or Firm* — Dinsmore & Shohl LLP

(57) ABSTRACT

A power storage device includes: a power storage stack; paired end plates; paired side covers; an upper constraint member; and a lower constraint member. The power storage stack has: a first stack; a second stack; and an intermediate plate. The paired side covers each have an intermediate engagement portion that engages with the intermediate plate, and paired side end engagement portions that laterally engage with the paired end plates, respectively. The upper constraint member constrains the power storage stack, while permitting the intermediate plate to move relative to the upper constraint member in the one direction, and the lower constraint member constrains the power storage stack, while permitting the intermediate plate to move relative to the lower constraint member in the one direction.

2 Claims, 2 Drawing Sheets

POWER STORAGE DEVICE

CROSS REFERENCE TO RELATED APPLICATIONS

This nonprovisional application claims priority to Japanese Patent Application No. 2021-104014 filed on Jun. 23, 2021 with the Japan Patent Office, the entire content of which is hereby incorporated by reference.

BACKGROUND

Field

The present disclosure relates to a power storage device.

Description of the Background Art

For example, Japanese Patent Laying-Open No. 2020-187853 discloses a power storage device, comprising: multiple power storage cells aligned in one direction; paired end plates that are disposed on opposite ends of the power storage cells in the one direction; a housing accommodating the power storage cells; intermediate plates disposed between the power storage cells; and a constraint band constraining the power storage cells from either side of the paired end plates in the one direction.

SUMMARY

The power storage device, as disclosed in Japanese Patent Laying-Open No. 2020-187853, is required to appropriately position the end plates and the intermediate plate. In such a power storage device, in contrast, the power storage cells vary in thickness or expansion coefficient, and there is thus a concern over nonuniformity in the surface pressure acting on the power storage cells.

An object of the present disclosure is to provide a power storage device that can reduce the nonuniformity in surface pressure acting on the power storage cells, while positioning the end plates and the intermediate plate.

A power storage device according to one aspect of the present disclosure includes: a power storage stack which includes a plurality of power storage cells aligned in one direction; paired end plates disposed on opposite sides of the power storage stack in the one direction; paired side covers disposed on opposite sides of the power storage stack in an orthogonal direction orthogonal to the one direction and a vertical direction, constraining the power storage stack from either side in the one direction; an upper constraint member disposed above the power storage stack, constraining the power storage stack from either side in the one direction; and a lower constraint member disposed below the power storage stack, constraining the power storage stack from either side in the one direction, wherein the power storage stack has: a first stack including some among the plurality of power storage cells; a second stack including remaining power storage cells among the plurality of power storage cells; and an intermediate plate disposed between the first stack and the second stack, wherein the paired side covers each have: an intermediate engagement portion that engages with the intermediate plate; and paired side end engagement portions that laterally engage with the paired end plates, respectively, wherein the upper constraint member constrains the power storage stack, while permitting the intermediate plate to move relative to the upper constraint member in the one direction, and the lower constraint member constrains the power storage stack, while permitting the intermediate plate to move relative to the lower constraint member in the one direction.

The foregoing and other objects, features, aspects and advantages of the present disclosure will become more apparent from the following detailed description of the present disclosure when taken in conjunction with the accompanying drawings.

DETAILED DESCRIPTION

Figure 1:
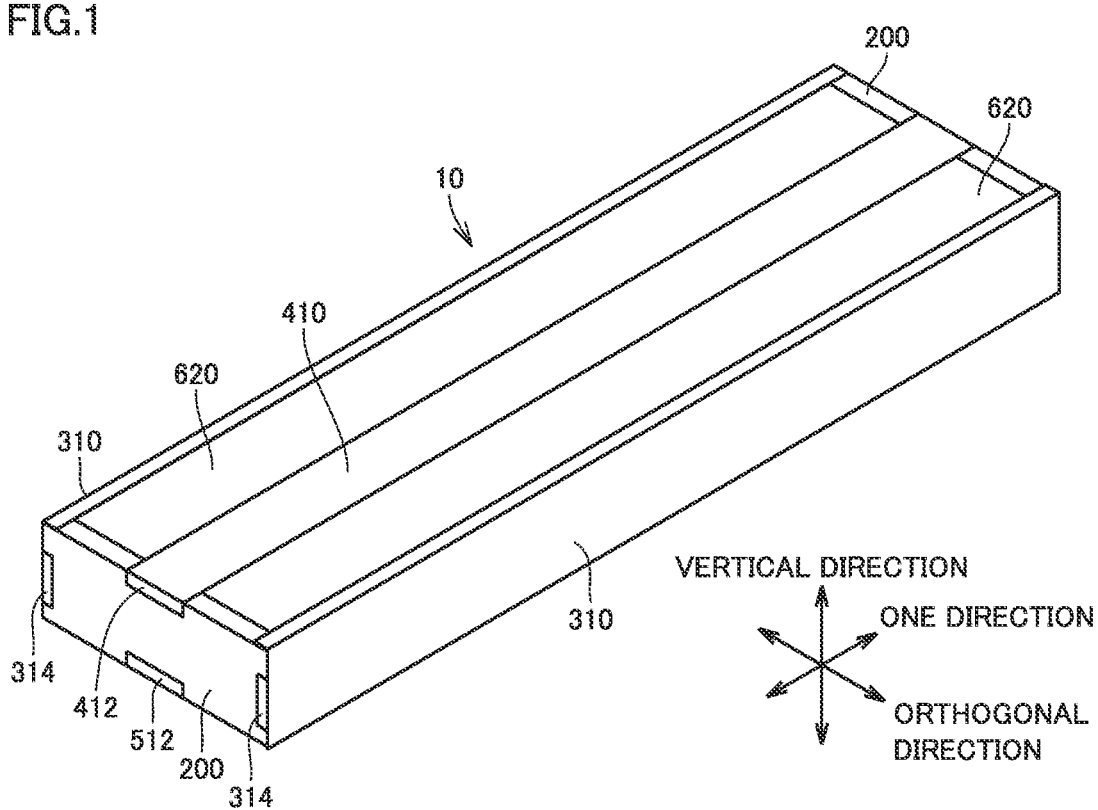
FIG. 1 is a perspective view of a power storage device according to one embodiment of the present disclosure.

An embodiment according to the present disclosure will be described, with reference to the accompanying drawings. Referring now to the drawings wherein like numerals are used to refer to like or corresponding members.

Figure 2:
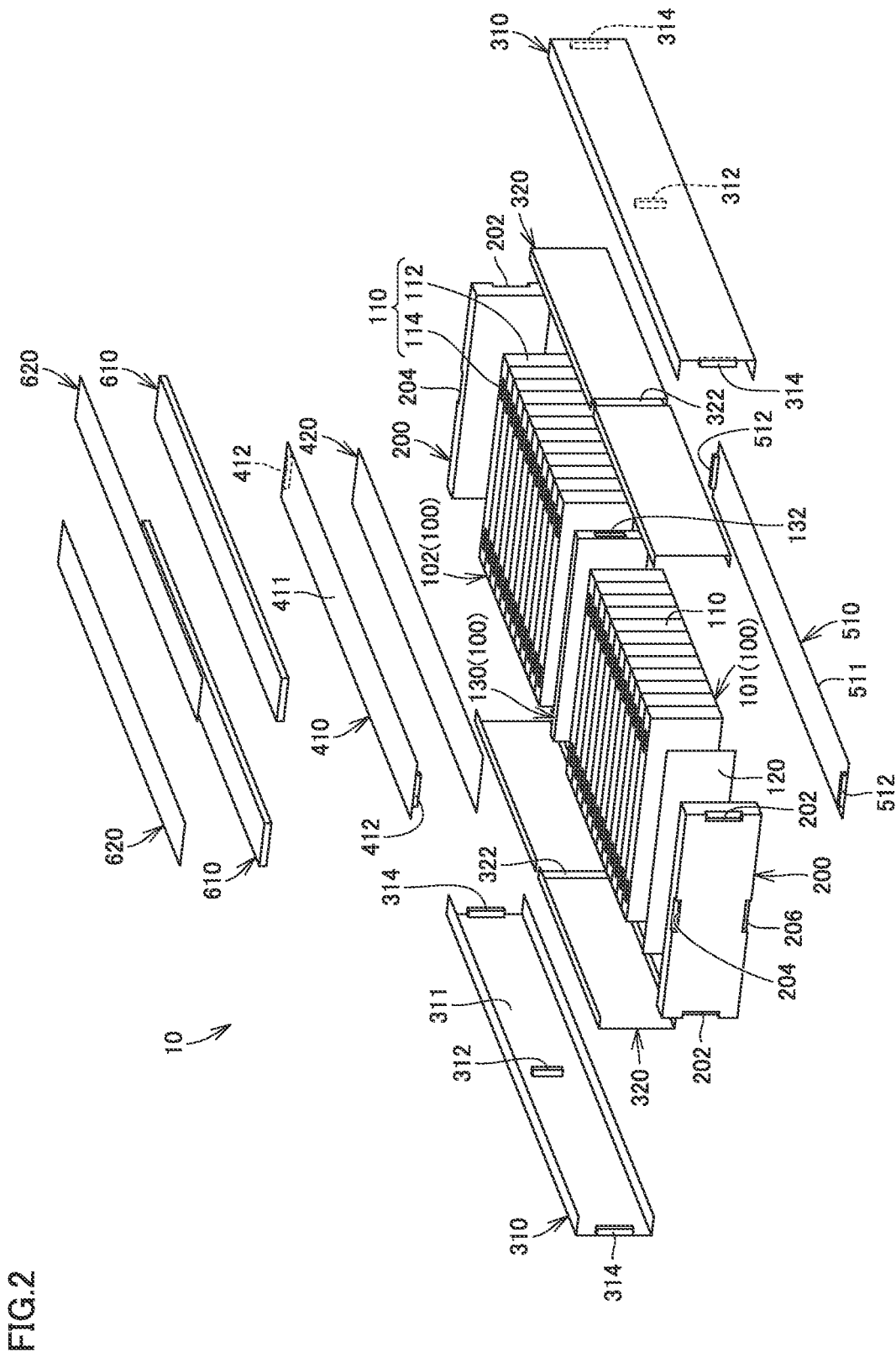
FIG. 2 is an exploded perspective view of the power storage device.

FIG. 1 is a perspective view of a power storage device according to one embodiment of the present disclosure. FIG. 2 is an exploded perspective view of the power storage device. A power storage device 10 is mounted on a vehicle, for example.

As shown in FIGS. 1 and 2, the power storage device 10 includes a power storage stack 100, paired end plates 200, paired side covers 310, paired side insulating members 320, an upper constraint member 410, an upper insulating member 420, a lower constraint member 510, a bus bar module 610, a bus bar module cover 620.

The power storage stack 100 includes multiple power storage cells 110 aligned in one direction. In the present embodiment, the power storage stack 100 includes 24 power storage cells 110. However, the number of power storage cells 110 is not limited thereto. Examples of the power storage cell 110 include a lithium-ion battery. The power storage cells 110 each have a case 112 and paired external terminals 114.

The case 112 accommodates electrodes (not shown). The case 112 is formed in a cuboid shape. The case 112 is formed flat. The power storage cells 110 are alighted in the direction of thickness of the cases 112. The case 112 is formed of a metal, for example.

The external terminal 114 protrudes from the upper surface of the case 112. One of the paired external terminals 114 is a positive terminal, and the other one of the paired external terminals 114 is a negative terminal.

The power storage stack 100 has a first stack 101, a second stack 102, and an intermediate plate 130.

The first stack 101 includes some of the power storage cells 110. Among the power storage cells 110, the first stack 101 includes power storage cells 110 that are disposed on one end of the one direction. In the present embodiment, the first stack 101 includes twelve power storage cells 110.

Among power storage cells 110, the second stack 102 includes the remaining power storage cells 110. Among the power storage cells 110, the second stack 102 includes power storage cells 110 that are disclosed in the other end of the one direction. In the present embodiment, the second stack 102 includes twelve power storage cells 110.

The intermediate plate 130 is disposed between the first stack 101 and the second stack 102. The intermediate plate 130 is made of an insulating material (a synthesis resin or the like).

As shown in FIG. 2, the first stack 101 and the second stack 102 include multiple elastics 120. Each elastic 120 is in a thin film form or a sheet form, and formed in a rectangular shape. Elastics 120 are disposed on opposite sides of each power storage cell 110 in the one direction. In the present embodiment, the first stack 101 and the second stack 102 each have thirteen elastics 120.

The paired end plates 200 are disposed on opposite sides of the power storage stack 100 in the one direction. In other words, one of the paired end plates 200 is disposed on the outer side of the first stack 101 in the one direction, and the other one of the paired end plates 200 is disposed on the outer side of the second stack 102 in the one direction. Each end plate 200 is formed of a metal, for example.

The paired side covers 310 are disposed on opposite sides of the power storage stack 100 in an orthogonal direction orthogonal to the one direction and the vertical direction. Each side cover 310 covers a side portion of the power storage stack 100. Each side cover 310 is formed of a metal or the like. Each side cover 310 has a cover body 311, an intermediate engagement portion 312, and paired side end engagement portions 314.

The cover body 311 has a shape extending from one end portion of the power storage stack 100 to the other end portion in the one direction. The cover body 311 is formed in a flat plate shape.

The intermediate engagement portion 312 laterally engages with the intermediate plate 130. The intermediate engagement portion 312 is formed at the center portion of the cover body 311 in the one direction. The intermediate engagement portion 312 protrudes from the center portion of the inner surface of the cover body 311 toward the intermediate plate 130, the intermediate engagement portion 312 having a shape extending in the vertical direction.

As shown in FIG. 2, the intermediate plate 130 has a side portion (an end portion in the orthogonal direction) having a recess 132 formed therein. The recess 132 fits into the intermediate engagement portion 312.

Each side end engagement portion 314 laterally engages with the end plate 200. Each side end engagement portion 314 is formed at an end portion of the cover body 311 in the one direction. The side end engagement portion 314 protrudes from an end portion of the inner surface of the cover body 311 toward the end plate 200, the side end engagement portion 314 having a shape extending in the vertical direction.

As shown in FIG. 2, the end plate 200 has a side portion having a side recess 202 formed therein. The side recess 202 fits into the side end engagement portion 314.

Each side insulating member 320 is made of an insulating member, and disposed between the power storage stack 100 and the side cover 310. In the present embodiment, each side insulating member 320 is formed of a flexible sheet made of a synthesis resin. The side insulating member 320 has an insertion part 322 which passes therethrough the intermediate engagement portion 312. In the present embodiment, each side insulating member 320 includes a first side insulating member disposed lateral of the first stack 101, and a second side insulating member disposed lateral of the second stack 102. The first side insulating member and the second side insulating member are disposed spaced apart from each other in the one direction so that the insertion part 322 is formed between the first side insulating member and the second side insulating member.

The upper constraint member 410 is disposed above the power storage stack 100, constraining the power storage stack 100 from either side of the power storage stack 100 in the one direction. The upper constraint member 410 constrains the power storage stack 100, while permitting the intermediate plate 130 to move relative to the upper constraint member 410 in the one direction. Specifically, the upper constraint member 410, while it engages with the end plates 200, does not engage with the intermediate plate 130.

The upper constraint member 410 has an upper constraint member body 411 and paired upper end engagement portions 412.

The upper constraint member body 411 has a shape extending from one end of the power storage stack 100 to the other end in the one direction. The upper constraint member body 411 is disposed above the power storage stack 100, and at the center portion of the power storage stack 100 in the orthogonal direction.

Each upper end engagement portion 412 engages with an end plate 200. Each upper end engagement portion 412 is formed at an end portion of the upper constraint member body 411 in the one direction. Each upper end engagement portion 412 has a shape protruding downward from the end portion of the lower surface of the upper constraint member body 411 in the one direction.

As shown in FIG. 2, the end plate 200 has an upper recess 204 formed in the upper portion of the end plate 200. The upper recess 204 fits into the upper end engagement portion 412.

The upper insulating member 420 is made of an insulating member, and disposed between the power storage stack 100 and the upper constraint member 410. In the present embodiment, the upper insulating member 420 is formed on a flexible sheet made of a synthesis resin.

The lower constraint member 510 is disposed below the power storage stack 100, constraining the power storage stack 100 from either side in the one direction. The lower constraint member 510 constrains the power storage stack 100, while permitting the intermediate plate 130 to move relative to the lower constraint member 510 in the one direction. Specifically, the lower constraint member 510, while it engages with the end plates 200, does not engage with the intermediate plate 130.

The lower constraint member 510 has a lower constraint member body 511 and paired lower end engagement portions 512.

The lower constraint member body 511 has a shape extending from one end of the power storage stack 100 to the other end in the one direction. The lower constraint member body 511 is disposed below the power storage stack 100, and at the center portion of the power storage stack 100 in the orthogonal direction.

Each lower end engagement portion 512 engages with an end plate 200. Each lower end engagement portion 512 is formed at an end portion of the lower constraint member body 511 in the one direction. Each lower end engagement portion 512 has a shape protruding upward from the end portion of the upper surface of the lower constraint member body 511 in the one direction.

As shown in FIG. 2, the end plate 200 has a lower portion having a lower recess 206 formed therein. The lower recess 206 fits into the lower end engagement portion 512.

The bus bar module 610 is disposed above the power storage stack 100. The bus bar module 610 includes multiple bus bars for electrically connecting the external terminals 114 of adjacent paired power storage cells 110. The bus bar module 610 is connected to the end plate 200 from above the end plate 200.

The bus bar module cover 620 covers the bus bar module 610.

As described above, in the power storage device 10 according to the present embodiment, the intermediate engagement portion 312 of the side cover 310 engages with the recess 132 formed in the intermediate plate 130, and the paired side end engagement portions 314 of the side cover 310 engage with the respective side recesses 202 formed in the end plate 200, thereby effectively positioning the end plates 200 and the intermediate plate 130. The upper constraint member 410 and the lower constraint member 510, in contrast, constrain the power storage stack 100, while permitting the intermediate plate 130 to move relative to the respective constraint members in the one direction, thereby reducing nonuniformity of the surface pressure acting on the power storage cells 110 included in the first stack 101 and the surface pressure acting on the power storage cells 110 included in the second stack 102.

Note that the intermediate engagement portion 312 may be formed in a recess receding outwardly in the orthogonal direction, and the side portion of the end plate 200 may have a protrusion that fits into the recess. This stands true for the relationship between the side end engagement portion 314 and the side recess 202, the relationship between the upper end engagement portion 412 and the upper recess 204, and the relationship between the lower end engagement portion 512 and the lower recess 206.

A person skilled in the art would understand that the exemplary embodiment described above presents specific examples of the following modes:

The power storage device according to the embodiment above includes: a power storage stack which includes a plurality of power storage cells aligned in one direction; paired end plates disposed on opposite sides of the power storage stack in the one direction; paired side covers disposed on opposite sides of the power storage stack in an orthogonal direction orthogonal to the one direction and a vertical direction, constraining the power storage stack from either side in the one direction; an upper constraint member disposed above the power storage stack, constraining the power storage stack from either side in the one direction; and a lower constraint member disposed below the power storage stack, constraining the power storage stack from either side in the one direction, wherein the power storage stack has: a first stack including some among the plurality of power storage cells; a second stack including remaining power storage cells among the plurality of power storage cells; and an intermediate plate disposed between the first stack and the second stack, wherein the paired side covers each have: an intermediate engagement portion that engages with the intermediate plate; and paired side end engagement portions that laterally engage with the paired end plates, respectively, wherein the upper constraint member constrains the power storage stack, while permitting the intermediate plate to move relative to the upper constraint member in the one direction, and the lower constraint member constrains the power storage stack, while permitting the intermediate plate to move relative to the lower constraint member in the one direction.

With the power storage device, each side cover has the intermediate engagement portion and the paired side end engagement portions, thereby effectively positioning the end plates and the intermediate plate. The upper constraint member and the lower constraint member, in contrast, constrain the power storage stack, while permitting the intermediate plate to move relative to the respective constraint members in the one direction, thereby reducing nonuniformity of the surface pressure acting on the power storage cells included in the first stack and the surface pressure acting on the power storage cells included in the second stack.

In some embodiments, the upper constraint member has paired upper end engagement portions that engage with the paired end plates, respectively, from above, and the lower constraint member has paired lower end engagement portions that engage with the paired end plates, respectively, from below.

In some embodiments, the paired side covers each have a cover body having a shape extending from one end of the power storage stack to the other end in the one direction, wherein the intermediate engagement portion has a shape protruding from the cover body toward the intermediate plate, and the intermediate plate has a recess that fits into the intermediate engagement portion.

In some embodiments, the paired side end engagement portions have shapes protruding from respective end portions of the cover body toward the paired end plates, respectively, in the one direction, and the paired end plates have respective side recesses that fit into the paired side end engagement portions, respectively.

In some embodiments, the power storage device further includes paired side insulating members each made of an insulating material and disposed between the power storage stack and each of the paired side covers, wherein the paired side insulating members each have an insertion part that passes the intermediate engagement portion.

In this way, the electrical insulation between the power storage stack and the side cover and the engagement of the intermediate engagement portion with the intermediate plate are achieved at the same time.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage device, comprising:
a power storage stack which includes a plurality of power storage cells aligned in one direction;
paired end plates disposed on opposite sides of the power storage stack in the one direction;
paired side covers disposed on opposite sides of the power storage stack in an orthogonal direction orthogonal to the one direction and a vertical direction, constraining the power storage stack from either side in the one direction;
paired side insulating members each made of an insulating material and disposed between the power storage stack and each of the paired side covers;
an upper constraint member disposed above the power storage stack, constraining the power storage stack from either side in the one direction;
an upper insulating member made of an insulating material and disposed between the power storage stack and the upper constraint member;
a lower constraint member disposed below the power storage stack, constraining the power storage stack from either side in the one direction;
a bus bar module disposed above the power storage stack, the bus bar module electrically connecting a pair of the power storage cells adjacent to each other; and
a bus bar module cover covering the bus bar module, wherein:
the power storage stack has:

a first stack including some among the plurality of power storage cells;

a second stack including remaining power storage cells among the plurality of power storage cells; and an intermediate plate disposed between the first stack and the second stack, wherein the paired side covers each have:

a cover body having a shape extending from one end of the power storage stack to the other end in the one direction;

an intermediate engagement portion that has a shape protruding from the cover body toward the intermediate plate and engages with the intermediate plate; and paired side end engagement portions that have shapes protruding from respective end portions of the cover body toward the paired end plates in the one direction and laterally engage with the paired end plates, respectively, the intermediate plate has a recess that fits the intermediate engagement portion, wherein the paired end plates have side recesses that fit the paired side end engagement portions, respectively, the paired side insulating members each have:

a first side insulating member disposed lateral of the first stack, and a second side insulating member disposed lateral of the second stack, the second side insulating member is disposed at a distance from the first side insulating member in the one direction so that an insertion portion, through which the intermediate engagement portion is inserted, is formed between the second side insulating member and the first side insulating member, the bus bar module is connected to each of the paired end plates from above, the upper constraint member constrains the power storage stack, while permitting the intermediate plate to move relative to the upper constraint member in the one direction, and the lower constraint member constrains the power storage stack, while permitting the intermediate plate to move relative to the lower constraint member in the one direction.

2. The power storage device according to claim 1, wherein the upper constraint member has paired upper end engagement portions that engage with the paired end plates, respectively, from above, and the lower constraint member has paired lower end engagement portions that engage with the paired end plates, respectively, from below.

* * * * *